United States Patent
Ge et al.

(10) Patent No.: US 9,576,364 B1
(45) Date of Patent: *Feb. 21, 2017

(54) RELATIVE POSITIONING OF A MOBILE COMPUTING DEVICE IN A NETWORK

(71) Applicant: International Business Machines Corporation, Armonk, NY (US)

(72) Inventors: Jin Ge, Beijing (CN); Juan Gu, Yancheng (CN); Yong Deng Hu, Beijing (CN); Wen Jiang, Beijing (CN); Xiao Lv, Beijing (CN); Hui Qiu, Beijing (CN); Michael Starkey, Prague (CZ)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/184,357

(22) Filed: Jun. 16, 2016

Related U.S. Application Data (63) Continuation of application No. 15/063,553, filed on Mar. 8, 2016, now Pat. No. 9,412,000, which is a
(Continued)

(51) Int. Cl.
*G06K 9/00* (2006.01)
*G06T 7/00* (2006.01)
(Continued)

(52) U.S. Cl.
CPC ............ *G06T 7/004* (2013.01); *G01S 5/0289* (2013.01); *H04W 4/04* (2013.01); *G06T 2200/32* (2013.01)

(58) Field of Classification Search
CPC ......... G06T 2207/10016; G06T 7/2033; G06T 7/20; G06K 9/3241; G06K 9/00771
(Continued)

(56) References Cited

U.S. PATENT DOCUMENTS

| 8,531,519 B1 | 9/2013 | Peng et al. |
| 2008/0159593 A1 | 7/2008 | Taylor |

(Continued)

FOREIGN PATENT DOCUMENTS

EP    2632188 A1    8/2013

OTHER PUBLICATIONS

Chung et al., "Shuriken: User Grouping and Data Transfer for Collaborative Shopping and Offline Meetings Based on Inter-Device Relative Positioning", CSCW '15 Companion, Mar. 14-18, 2015, Vancouver, BC, Canada, ACM, pp. 151-154.
(Continued)

*Primary Examiner* — Ruiping Li
(74) *Attorney, Agent, or Firm* — Maeve Carpenter (57) ABSTRACT

In an approach to determining a relative position for each computer of a group of computers within a wireless network to a computer within the wireless network, a computer receives a set of digital image files from each computer and aggregates the set of digital image files into a panoramic digital image file. The computer generates a network map depicting a position of each of the computers based on the panoramic digital image file. The computer determines a relative position map for at least one computer based on the network map and the panoramic digital image file, wherein the relative position map provides a location of each computer of the group of computers with respect to the at least one computer. The computer receives input from the at least one computer, the input using the relative position map to send data to one or more of the group of computers.

1 Claim, 5 Drawing Sheets

Related U.S. Application Data continuation of application No. 14/954,659, filed on Nov. 30, 2015.

(51) Int. Cl.
*H04W 4/04* (2009.01)
*G01S 5/02* (2010.01)

(58) Field of Classification Search
USPC .......................................................... 382/103
See application file for complete search history.

(56) References Cited

U.S. PATENT DOCUMENTS

| | | |
|---|---|---|
| 2009/0080697 A1* | 3/2009 | Kishikawa ............. G01C 15/00 382/103 |
| 2012/0289243 A1 | 11/2012 | Tarlow et al. |
| 2012/0300020 A1 | 11/2012 | Arth et al. |
| 2014/0250191 A1 | 9/2014 | Altman |
| 2014/0282066 A1 | 9/2014 | Dawson et al. |
| 2014/0323162 A1 | 10/2014 | Ezra et al. |
| 2015/0036016 A1 | 2/2015 | Jovicic et al. |

OTHER PUBLICATIONS

O'Sullivan, Adam, "Multiphono: Relative Positioning of Co-located Mobile Devices", Computer Science University of Maryland, Scholarly Paper, 9 pages, Captured on Jul. 20, 2015, <https://www.cs.umd.edu/grad/scholarlypapers/papers/OSullivan.pdf>.
Appendix P (List of IBM Patents or Patent Applications Treated as Related), 2 pages, filed herewith.
U.S. Appl. No. 14/954,659, filed Nov. 30, 2015.
U.S. Appl. No. 15/063,553, filed Mar. 8, 2016.

* cited by examiner

RELATIVE POSITIONING OF A MOBILE COMPUTING DEVICE IN A NETWORK

BACKGROUND

The present invention relates generally to the field of image analysis, and more particularly to a method for determining the relative position of computers in a network.

As the use of mobile computing devices such as smart phones and tablets becomes pervasive, the location determination of a device can be done using known technologies such as global positioning systems (GPS) embedded in mobile computing devices and other computing devices. GPS systems using a number of satellites and the arrival time of signals between cellular towers triangulate the position of a mobile computer or smart phone. In addition, GPS systems can be augmented for improved accuracy in determining a device location by using Wi-Fi positioning, particularly in indoor or sheltered locations where reception of satellite transmissions may be difficult. However, the degree of accuracy of GPS systems using Wi-Fi positioning of computers, particularly, in indoor locations may provide only a general location with a degree of accuracy that is in the range of five to ten meters. A location in one to two meter range or better in terms of locational accuracy may require more than the usual GPS positioning provided in standard smart phones or mobile computing devices.

SUMMARY

Embodiments of the present invention disclose a method, a computer program product, and a system for determining a relative position for each computing device of a group of computing devices within a wireless network to a computing device within the wireless network. The computer program product includes receiving a set of digital image files from each computing device of the group of computing devices within the wireless network and aggregating the set of digital image files into a panoramic digital image file. The computer program product includes generating a network map depicting a position of each of the computing devices in the group of computing devices within the wireless network based, at least in part, on the panoramic digital image file. The computer program product then includes determining a relative position map for at least one computing device based, at least in part, on the network map and the panoramic digital image file, wherein the relative position map provides a location of each computing device of the group of computing devices within the wireless network with respect to the at least one computing device, and wherein the relative position map is determined by a set of relative position angles that provide a location of each of the computing devices in the group of computing devices with respect to the at least one computing device, the set of relative position angles based, at least in part, on the panoramic digital image file. The computer program product includes receiving input from the at least one computing device, the input using the relative position map to send data to one or more computing devices of the group of computing devices within the wireless network.

DETAILED DESCRIPTION

Embodiments of the present invention recognize that a group of computers connected in a local wireless network may desire more precise location determination of the other computers in the local wireless network for the collaboration and data sharing within the network. Embodiments of the present invention recognize that users of the group of computers connected in a local wireless network may desire to set-up a network identifying the relative location of each computer relative to the other computers in the group to quickly and efficiently share data.

Embodiments of the present invention provide a method, a computer product, and a system to determine a relative location for a plurality of computers in a local wireless network based, at least in part, on one or more digital photographs provided by one or more of the computers in the network. Embodiments of the present invention provide each computer in the network with a relative position map identifying the location of each of the other computers in the network relative to the computer receiving the relative position map, where the relative position map may be used to share data between the computers in the local wireless network.

Figure 1:
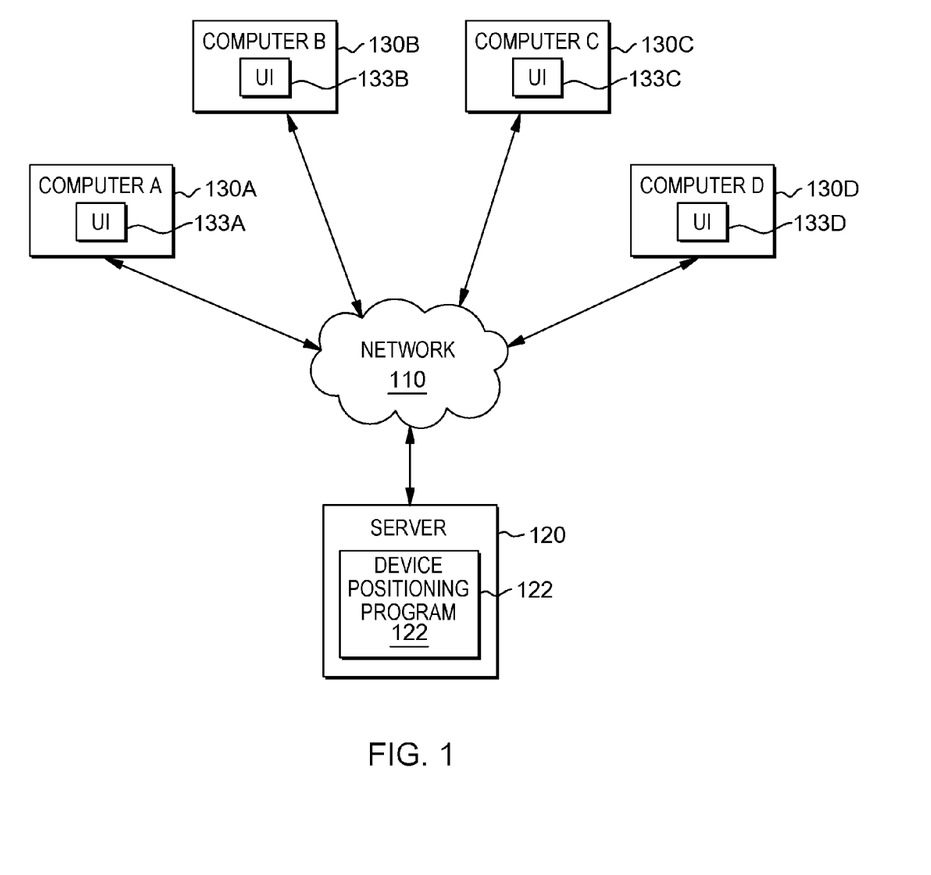
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention.

Distributed data processing environment 100 includes server 120, computers A, B, C and D interconnected over network 110. Network 110 can be, for example, a telecommunications network, a local area network (LAN), a virtual LAN (VLAN), a wide area network (WAN), such as the Internet, or a combination of these, and can include wired, wireless, virtual, or fiber optic connections. Network 110 can include one or more wired and/or wireless networks that are capable of receiving and transmitting data, voice, and/or video signals, including multimedia signals that include voice, data, and video information. In general, network 110 can be any combination of connections and protocols that will support communications between server 120, computers 130A, 130B, 130C, and 130D (computers 130A, B, C and D hereinafter) and other computing devices (not shown) within distributed data processing environment 100. In various embodiments of the present invention, network 110 includes but is not limited to a local area network, a wireless ad hoc network (WANET), a peer-to-peer (P2P) network, other similar localized network or network between computers 130A, B, C and D that may be initiated by one or more attendees in a meeting or a group. As known to one skilled in the art, a P2P network is a network in which interconnected nodes (i.e., peers or peer computers) share resources between each other without the use of a centralized server for administration of resources and a WANET is a decentralized type of a wireless network that is is a self-configuring, dynamic network in which the nodes are free to move. WANETs enable devices or computers such as smart phones to create and join the WANET at any time. In various embodiments, network 110 is a global system of interconnected computer networks that use the Internet protocol suite (TCP/IP) such as the Internet.

Server 120 can be a web server, a management server, a standalone computing device, a database server, a mobile computing device, a laptop computer, a desktop computer, or any other electronic device or computing system capable of receiving, sending, storing, and processing data. In various embodiments, server 120 represents a computing system utilizing clustered computers and components (e.g., database server computers, application server computers, etc.) that act as a single pool of seamless resources, such as in a cloud computing environment, when accessed within distributed data processing environment 100. In various embodiments, each of the programs, applications, and databases on server 120 and computers A, B, C and D can reside on one or more other computing devices with distributed data processing environment 100, provided each has access to information and storage for implementation and operations of the present invention via network 110.

Server 120 hosts device positioning program 122. Server 120 may be a web server, a tablet computer, a netbook computer, a personal computer (PC), a personal digital assistant (PDA), a smart phone, or any programmable electronic device capable of communicating with computers 130A, B, C, and D and any other computing components and devices not shown in FIG. 1 in distributed data processing environment 100. Server 120 is capable of receiving digital photographs and digital videos from computers 130A, B, C, and D. Server 120 has the capability to perform digital data merge and positional analysis of photographs and digital video received from computers 130A, B, C, and D. Server 120 is capable of sending, receiving data and supporting a wireless network, which may be a temporary local wireless network created between computers 130A, B, C, and D where wireless connections occur using Bluetooth® or other known wireless technologies. Server 120 may include internal and external hardware components, as depicted and described in further detail with respect to FIG. 4.

Device positioning program 122 generates a relative position map for each computer in the network based at least in part on the received digital image files from the photographs taken by one or more computers in the network. A panoramic digital image file can be created by stitching or aggregating the received digital image files using known software algorithms. In order to generate the relative position map for each computer, device positioning program 122 generates a network map based, at least in part, on an analysis of a panoramic digital image file created from the stitched or joined the digital image files. In various embodiments, the network map is a scaled (e.g., not to actual size) representation of the physical location of the nodes or computers in the wireless network as projected in a circle based on the joined photographs. A network map includes the network topology or connections between the one or more computers or nodes connected in a network. Network topology is the arrangement or connections of various elements (e.g., nodes/computers and links) in a computer network. In various embodiments, device positioning program 122 fits the panoramic digital image file in a circle and identifies the location of each of the computers in network 110 based, at least in part, on an analysis of the received digital image files received from each of the computers. Using the panoramic digital image file of merged digital image data from one or more of computers 130A, B, C, and D, device positioning program 122 determines a network map representing the location of each of the computers based on the created panoramic digital image file.

In various embodiments, the network map generated by device positioning program 122 includes a computer identification provided by each computer in the network 110. In an embodiment, device positioning program 122 retrieves the computer identification for each computer from the attendee configured network (e.g. WANET). A device identification may be a device identification or a unique device identification such as a media access control address (MAC address), an internet protocol (IP) address, or another known device identification used for a computer in a network.

Figure 2:
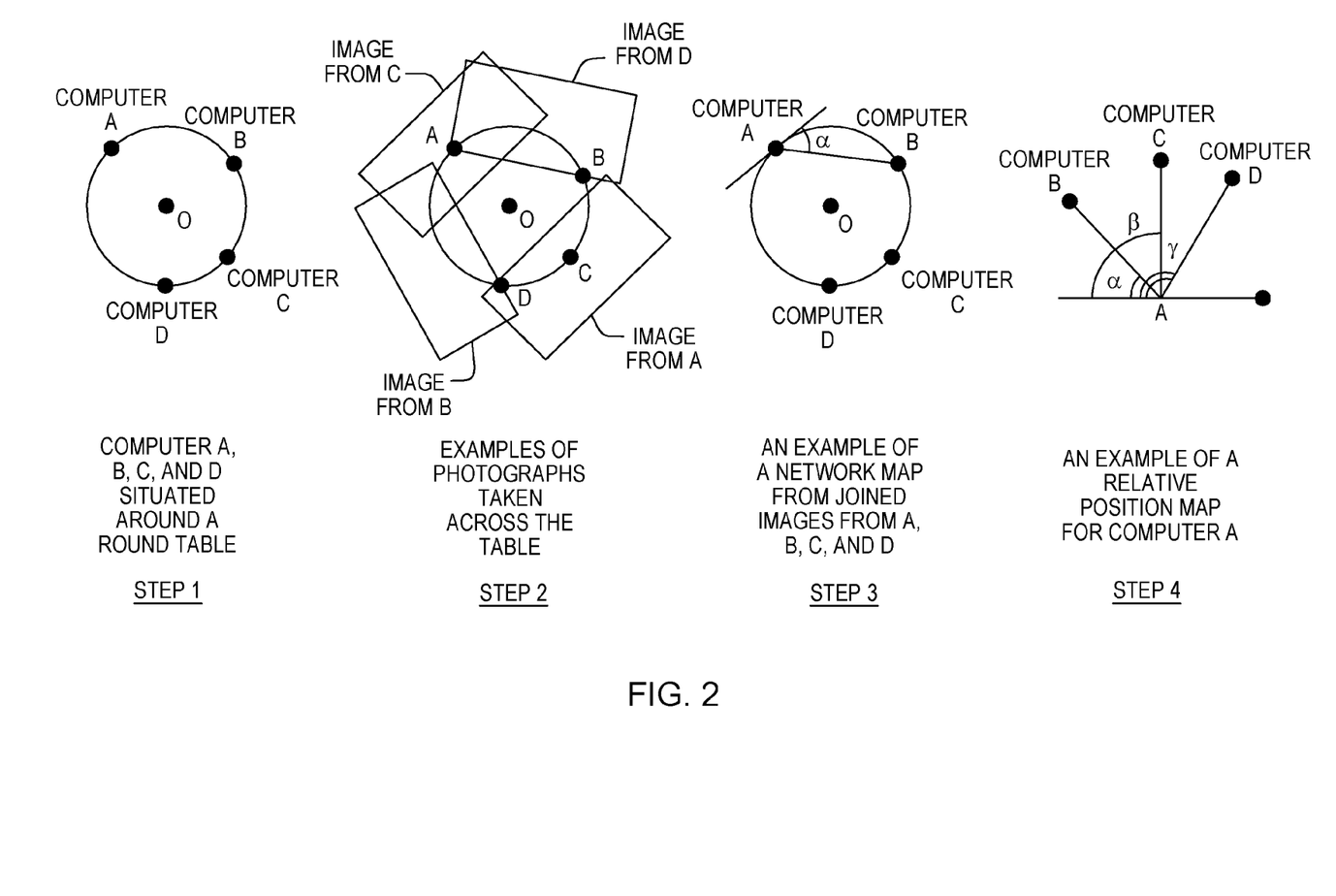
FIG. 2 is an example of diagrams depicting steps of a method for determining a relative position map, in accordance with an embodiment of the present invention.

Device positioning program 122 performs an analysis of the digital image data in the panoramic digital image file using and one or more of the methods discussed in detail later based on trigonometric functions and the created network map, and determines a relative position map for each computer in the network. A relative position map provides a location of each of the other computers in the network with respect to a target computer based on a relative position angle. A relative position angle identifies the location of a computer with respect to the target computer. For example, a relative position angle can be determined by an angle from a tangent to a circle at the location of the target computer (e.g., as depicted in FIG. 2 Step 3 and Step 4). In various embodiments, a relative position map is generated based at least on part on the one or more photographs or videos taken by one or more computers with a camera connected in the network. In some embodiments, device positioning program 122 receives from at least two computers a distance to each of the other computers in the network (e.g., measured using distance measuring software). Device positioning program 122 generates and sends a relative position map to computer A that provides the location of computers B, C, and D with respect to computer A. For example, as depicted in the examples shown in FIG. 2 Step 3 and Step 4, a relative position map depicts the location of computer B, computer C and computer D to a tangent to the circle representing the location of each computer in the network (e.g., a network map) when the tangent is drawn at the location of computer A.

Using one or more of several methods, device positioning program 122 determines a relative position map from a set of angles (i.e., a set of one or more relative position angles) where each of the angles in the set of relative position angles identifies the location of each of the other computers in the network with reference to a selected or a target computer. In various embodiments, the angles determining the relative position of one or more computers in the network with respect to a target computer are determined from one of a tangent to a circle (e.g., the network map) at the target computer's location in the network (e.g., as depicted in FIG. 2 Step 3 and Step 4) or an angle from the center of a circle, where the angle is from a computer to the center of the circle created by stitching photographs, and to the target computer as depicted later in FIG. 4 Method I.

In various embodiments, the set of relative position angles are used to create a relative position map that is sent the target computer. The relative position map identifies the location of each of the other computers in the network with respect to the target computer and includes the provided computer identification for each computer or node in the network.

A relative position map can be used by the computers in the network to share or send data between the various computers in the network. In various embodiments, device positioning program 122 uses the relative positioning map in conjunction with provided device identifications received with the photographs across the center of a circle of attendees to send data between computers in the network. For example, device positioning program 122 using a relative position map that includes the device identification for each computer or node in network 110 can send a file from computer A to computer B when an attendee slides a finger on a relative position map displayed on a user interface, such as user interfaces (UI) 133A, on computer A. Using device positioning program 122, an attendee on another device may slide a finger from the identified location of computer A to computer B on the relative position map to send data from computer A to computer B, for example.

The relative position map for each computer can be sent over network 110 to the target computer for which the relative position map was created. For example, a relative position map providing the location of computers 130A, B, and C with respect to computer D is sent to computer D. While depicted on server 120, device positioning program 122 may reside on another server, another computing device, or other multiple computing devices. In some embodiments, device positioning program 122 resides on each of the computers in the local wireless network, network 110 (e.g., on computer A, computer B, etc.). In an embodiment, device positioning program 122 resides on at least one computer in network 110.

Computers 130A, 130B, 130C, and 130D, abbreviated as computers 130A, B, C, and D hereafter, may be a smart phone, a tablet, a smart watch, a notebook, a laptop, a personal digital assistant, a desktop computer, or other computing system connected to server 120 via network 110. In various embodiments, computers 130A, B, C, and D are clients to server 120. Computers 130A, B, C, and D include user interfaces (UI) 133A, B, C, and D. Computers 130A, B, C, and D have the capability to take photographs or video (e.g., have digital cameras or digital video capture). Additionally, in various embodiments, at least two of computers 130A, B, C, and D include a software application for determining distance to an object as known to one skilled in the art (e.g., Apple® EasyMeasure application or similar known applications for android-based phones). In an embodiment, each of the computers (e.g., computers A, B, C, and D) have a distance measuring application or software.

Computers 130A, B, C, and D sends and receives data and information such as digital photographs, digital video, and relative position network maps to and from server 120. Computers 130A, B, C, and D includes software algorithms, software applications, or programs as are commonly used and are known to one skilled in the art that provide computers 130A, B, C, and D with the capability to be wirelessly connected using Bluetooth® technology or other known wireless technology. Computers 130A, B, C, and D may be connected together in a network, such as network 110, to share information or data. The wireless network can be a temporary network connecting computers 130A, B, C, and D (e.g., a temporary local network where connections are released after a meeting or a completion of desired data sharing).

Computers 130A, B, C, and D send a request for a local network or localized connections between computers 130A, B, C, and D, send digital image data such as digital photographs taken straight ahead in a group, taken across a round table, taken around a table, desk, or other structure, or a group standing, or a digital video of the view of the other meeting attendees or users around a table to server 120, and receive a relative position map from server 120. In addition to sending digital image files of photographs, computers 130A, B, C, and D send device identification such as a media access control address (MAC address) to device positioning program 122 on server 120. In some embodiments, device positioning program 122 resides in computers 130A, B, C, and D and each computer (i.e., each of computer 130A, B, C, and D) in the connected network sends and receives digital image data (e.g., photographs or video). For example, computers 130A, B, C, and D can determine a relative position map for each of the other devices connected (e.g., in the wireless network) using device positioning program 122. Computers 130A, B, C, and D may send and receive data from other computing devices (not shown). Computers 130A, B, C, and D are configured to utilize the received relative position map to send and receive data from the other computers (e.g., computers 130A, B, C, and D) in the wireless network 110 depicted in a network map determined by device positioning program 122. While computers 130A, B, C, and D are depicted as the devices connected in the wireless network, the network is not limited to four computers but, can be any number of computers greater than two that can be supported by server 120 than can be a multiple servers, computers connected together (e.g., may be a "cloud").

User interface (UI) 133A, 133B, 133C, and UI 133D on computers 130A, B, C, and D respectively, are user interfaces providing an interface between a user of computers 130A, B, C, and D and server 120. UI 133A, B, C, and D enable the users of computers 130A, B, C, and D respectively to interact with programs and data on server 120, each of the other computers (i.e., A, B, C, and D) depicted, and other computing devices (not shown). UI 133A, B, C, and D may be graphical user interfaces (GUI), active areas or lines for text inputs, web user interfaces (WUI), or other type of user interfaces and can display a relative position network map and receive input for sending data to the other computers ((i.e., computers 130A, B, C, and D respectively). For example, UI 133 A is a touch screen capable of receiving a user interface input such as a touch, a slide of one or more fingers, or a double tap on a relative position map to indicate one of the other computers to send data or a message. A slide of a finger, a touch, a tap, or a double tap of one or more fingers may indicate a user input to device positioning program 122 via UI 133 A, B, C, and D on a relative position map to send data such as a selected file or a message to one or more specified computers indicated by the user input. In various embodiments, UI 133A, B, C, and D receives a user input via a touch screen, a key board, a mouse, a display, an audio, visual or motion sensing device or other peripheral device standard in computer devices. UI 133A, B, C, and D may be used to by a user to generate one or more digital photographs or videos, send the resulting digital image data with a device identification to server 120, and to receive a relative position map used to identify the relative location of the other devices (e.g., computers 130A, B, C, and/or D) in a local wireless network to send and receive information and data.

FIG. 2 is an example of diagram depicting an illustration of steps of one method for determining a relative position map, in accordance with an embodiment of the present invention. FIG. 2 is an illustration of steps 1, 2, 3, and 4 to generate a relative position map of computers B, C, and D for computer A. As depicted in Step 1, the attendees in a group of users meeting in a scheduled, an informal, or an impromptu meeting (i.e., an unplanned meeting) are in a circle or around a round table. In one embodiment, the attendees with computers connected in the network are randomly situated in a group or meeting (e.g., not in a circle). The attendee's computers are already connected together by the central server (i.e., server 120) or for example, through a P2P wireless network connection that includes connectivity to server 120. In Step 2, the attendees use computers A, B, C, and D to take a picture of the area directly in front of them across the circle or across the center of a round table (e.g., by pushing a button, a vibrating movement, a touch screen activation, or other known photograph activation method for a computer, smart phone, or other mobile computing device) that is sent to server 120. In various embodiments, the photographs taken across the table include at least a portion of the table edge. For example, five to twenty percent of the digital image includes the round table. In some embodiments, a user holding a computer or a smart phone on a monopod used to take photographs, e.g., a selfie stick, holds the computer (e.g., a smart phone) over the center of the group, and takes a series of photographs at a downward position around the group. For example, the computer creates a series of photographs of the group taken from a downward position for a bird's eye type of view of the meeting using the selfie stick.

In other embodiments, each of the computers take a set of more than one photographs or a video of the other computers (and other users or attendees) around a circular table or around a group of attendees and computers arranged in a circle. In this example, device positioning program 122 may analyze a set of photographs or digital image files taken from the same computer camera using one or more of the same sensor size, image distance, crop factor, or focal length from the computer camera and the same location.

In Step 3, device positioning program 122 on server 120 receives a set of at least one digital image files of the photographs taken by each of the computers A, B, C, and D or a plurality of photographs taken by a camera in a computer (e.g. one of computers A, B, C, or D). Device positioning program 122 uses known image processing methods to merge or join the pictures into one file (e.g., a panoramic digital image file of the meeting) by mapping the overlapping parts of the received digital image files or photographs. Device positioning program 122 develops a network map of the computers A, B, C, and D in the wireless network based, at least in part, on the order and location of the computers A, B, C, and D in the panoramic digital image data created from the linked or merged photographs (e.g., the full panorama or a 360 degree panorama of the meeting). In various embodiments, device positioning program 122 creates a network map from the panoramic digital image file of the photographs taken by the computers A, B, C, and D that includes the device identification for each computer depicted in the network map.

In Step 4, device positioning program 122 determines for each of the computers in the meeting (i.e., computers A, B, C, and D), a relative position map. The relative position map provides a location of each of the other computers to a computer (e.g., the position of computers A, B, and C with respect to computer D when computer D is the target computer receiving the relative position map). For example as depicted in Step 4 of FIG. 2, device positioning program 122 generates a relative position map for computer A that depicts the position of computers B, C, and D with respect to computer A. Device positioning program 122 sends the relative position maps to the respective computers (e.g., a relative position map for computer A to computer A, a relative position map for computer B to computer B, etc.). A relative position map provides a relative position or an angle providing a location of a computer from the perspective of a computer of interest (e.g., target computer A). In various embodiments, the relative position of computer B is based on an angle from a respective axis (e.g., usually an x-axis) that is tangential to a circle that can be a circle representing a network map depicting the locations of each computer in the network. For example, as depicted in Step 4, device positioning program 122 determines the relative position of computers B, C, and D with respect to computer A using the tangent to the network map as the x-axis. The angles α indicates the position of computer B from the perspective of computer A (e.g., relative to computer A) in the relative position map for computer A. Angle β indicates the position of computer C relative to computer A and angle γ indicates the relative position of D with respect to computer A in the relative position map for computer A. In an embodiment, device positioning program 122 determines a relative positioning angle from a center of a circle determined by the program based at least in part on the received photographs. For example, the relative positioning angles are the angles from the location of a target computer to the determined center of the circle to another computer as determined for each of the other computers in the network relative to the target computer. The methods used to determine a relative position map and a network map are discussed in more detail later with reference to FIG. 3 and FIG. 4.

The relative position map depicted in Step 4 can be used to send data, messages, or files from computer A to any of the other computers using the relative network map. The user of computer A may send a file to computer B, for example, using the device identification information of computer A and B, and by drawing a line between computers A and B on UI 133A, by sliding a finger from computer A to computer B. Computer B may be indicated by the direction of angle α and circle or spot labelled B, or by touching the representation of computer B where the representation may be a circle, a spot, a square, a shape, one or more letters, a name, a number, or an icon representing computer B on the relative position map for computer A.

Figure 3:
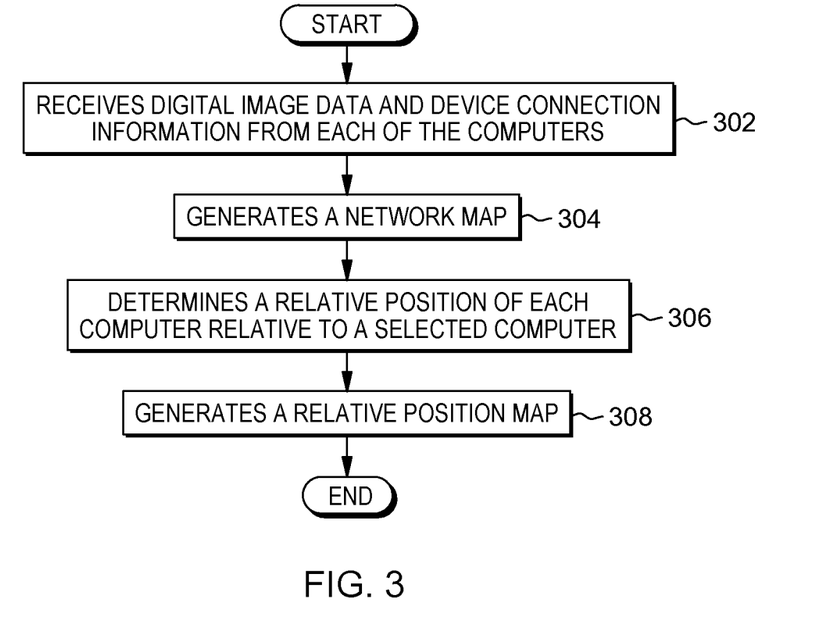
FIG. 3 is a flowchart depicting operational steps of a device positioning program, on a server within the data processing environment of FIG. 1, for providing a network relative position map, in accordance with an embodiment of the present invention.

FIG. 3 is a flowchart 300 depicting operational steps of device positioning program 122, on server 120 within the data processing environment of FIG. 1, for providing a relative position map for a computer in a wireless network 110, in accordance with an embodiment of the present invention.

Device positioning program 122 receives digital image data and device connection information from each of the computers (302) in the network. Computers 130A, B, C, and D are in a wirelessly connected network as may be set-up for a meeting or a P2P network for a meeting. Each of the attendees take one or more photographs or video using UI 133A, B, C, and D on one of computers 130A, B, C, and D respectively and send the one or more digital photographs or the digital videos along with a device identification for the respective computer (e.g., computer A, B, C, or D) to device positioning program 122. The device identification may be an IP address, a MAC address, or other known device identification used in network addressing. The device identification for each of computers 130A, B, C, and D in wireless network 110 can be included in the network map and the relative position map for providing the device identification to send data to in the network.

In various embodiments, the attendees each using a computer in a meeting or the group forming a local network or a temporary network connection between attendee's computers to share data and information are standing in a circle or around a round conference table to take a digital photograph. In some embodiments, the attendees are sitting. In other embodiments, some attendees are sitting while others are standing. In some embodiments, the attendees connected in the network are in a random (e.g., non-circular) arrangement. In various embodiments, at least two of the computers in the network have distance measuring software and measure the distance to each of the other computers in the network. In these embodiments, each of the computers measuring the distance to the other computers in the network sends the distance measurements (e.g., the distance between the measuring computer and each of the other computers in the network) to device positioning program 122.

In various embodiments, using the cameras in computers 130A, B, C, and D, each attendee takes a digital photograph of the view directly across a round conference table (i.e., aimed across the center of the conference table or dead ahead) that captures a portion of the edge of the table. In various embodiments, the photograph taken by each user across the center of the round conference table is used by device positioning program 122 to determine the relative position of the other attendees in the meeting. In some embodiments, an overlap of at least fifteen percent is provided between each adjacent attendee's (e.g., attendees standing or sitting next to each other) photographs to use known software applications for image.

In some embodiments, if the attendee is not using a computer with a camera utilizing a wide-angle photographic capability, then the attendee can take multiple photographs, a photo burst, or a video of the computers and attendees around the table or in the meeting. The attendee may shoot one or more successive photographs across the conference table from one side (e.g., the left side) to the other side of the conference table (e.g., the right side). In some embodiments when only three of four attendees are present, each attendee takes at least two photographs around the group of attendees. In other embodiments, the attendee takes a video moving from one side of the conference room to the other side (e.g., shooting video as the camera is rotated from the 7 o'clock position (i.e., 7 am) to 5 o'clock position (i.e., 5 pm) or rotating the camera in the reverse direction) so that a panoramic view of the meeting from the attendee's perspective is captured. In some embodiments, device positioning program 122 receives digital image files of photographs taken across the table without an edge of a round table in the photograph.

Device positioning program 122 receives the digital image data for the photographs taken over the center of the round conference by each attendee. In various embodiments, the digital image data includes metadata provided by the computer such as computer 130A, B, C, or D that captured the image. Digital camera technology used in computer cameras or smart phones cameras may capture metadata such as exchangeable image files (Exif) that stores technical metadata or data in the image files such as information on the device settings or capability of digital camera functioning in the computer. For example, as known to one skilled in the art the metadata may include one or more of the following: device model (e.g., camera/smart phone make/model), image size (e.g., in pixels or mm), image distance (i.e., the distance of the sensor to the lens), type of lens system used, the focal length of the camera in the computer or smart phone, an aspect ratio of the image captured (e.g., image width to image height), the power of the camera (the reciprocal of the focal length), date and time of photograph creation, and/or magnification factor.

In other embodiments, when video is received by device positioning program 122, the video includes a metadata file. For example, the metadata file may include the camera information listed above in addition to information on frame rate (the number of still picture captured per second), and aspect ratio that describes the dimensions of video screen elements and video picture elements (video formats for pixels can be rectilinear and pixels used in digital video may have non-square ratios between height and length). In various embodiments, device positioning program 122 has the ability to extract still images or extract and merge still images from video received from one or more of computers 130A, B, C, and D to use for creating a relative position map.

In other embodiments, device positioning program 122 receives a plurality of photographs taken around the meeting by one computer in the network. For example, computer A may take a series of photographs that capture all of the attendees and the surrounding. In this case, computer A may take a series of photographs from the 7 am position around to the 5 pm position. In another embodiment, one computer takes one or more photographs that include all of the other computer locations (i.e., all of the other attendees).

In some cases, the meeting attendees may have computers with cameras or smart phone cameras that use different camera or lens technology. In some embodiments, to join the digital image data generated by multiple computer devices accurately (e.g., computers 130A, B, C, and D) when the computers use different camera technologies, a standardization or a normalization of the digital image or digital image data may be performed by device positioning program 122. In various embodiments, device positioning program 122 normalizes the digital image data received to compensate for the effects of different camera technologies in the digital image data received from computers 130A, B, C, and D. For example, device positioning program 122 may normalize digital image data from different computers or smart phones using known techniques such as image feature matching algorithms (e.g., features from accelerated segment test (FAST) algorithm or another similar known image matching software algorithm). In other examples, device positioning program 122 may normalize digital images using known lens/image relationships and metadata included with the digital image data or file. Metadata provided with the received digital image may include the image distance, the lens focal length, or information on the computer model or smart phone model used to capture the image. Device positioning program 122 may determine a ratio or a compensation for different image distances (or focal length) provided in the metadata with the various photographs or digital image files. As known to one skilled in the art, the ratio between image distances (i.e., image distance for computer A/image distance for computer B) can be used by device positioning program 122 to adjust or standardize the distances in the digital image data A from computer A to the distances in the digital image data B from computer B. In one embodiment, device positioning program 122 standardizes the digital images to the computer with the camera with the smallest image distance. In another embodiment, device positioning program 122 standardizes the image to the most common image distance by the attendees' computer cameras.

In some embodiments, using known lens relationships, device positioning program 122 analyzes pictures taken at a known distance of an object of known size taken by attendees for normalization of various digital images created from various camera devices in computers 130A, B, C, and D. In this case, device positioning program 122 may use a lens equation determine a focal length for the camera when a picture of an object of known size is taken and analyzed. For example, device positioning program 122 can determine a focal length of a camera is equal to an image width of an object determined as captured by camera sensor multiplied by a distance of the camera to the object and divided by the width of the object determined by automatic image processing, which may be used to normalize digital images for various camera technologies. In other embodiments, device positioning program 122 does not normalize digital image data taken from various cameras. In this case, a best fit of digital image data may be used when photograph data is joined for a rough or an approximate computer location on a network map and an associated relative position map created using a panoramic digital image file of joined photographs taken by one or more computers in the network.

In other embodiments, the attendees input on their respective user interfaces, UI 133A, B, C, and D, one or more of data on camera focal length, sensor size, image distance, or aspect ratio for the camera device used in their computer, tablet, or smart phone (e.g., computers 130A, B, C, and D) where this data is used by device positioning program 122 with known lens relationships to normalize digital image data between various cameras. In another embodiment, device positioning program 122 includes a database that stores the camera technology information for the cameras in various computers. Examples of camera technology information that can be stored include focal length, aspect ratio, sensor size, etc. for specific computer/smart phones by model that may be retrieved by device positioning program 122. For example, DP 12 receives a digital image from and attendee and extracts from included metadata created by a smart phone model XY from company Z and determines the image distance for that smart phone by querying the database for the sensor size for that device.

Device positioning program 122 generates a network map (304). Device positioning program 122 joins the digital image data to generate a single meeting panoramic digital image file used, at least in part, as the basis for a network map. A network map includes the network topology or connections between the one or more computers or nodes connected in a network. Network topology is the arrangement or connections of various elements (e.g., nodes/computers and links) in a computer network. In some embodiments, device positioning program 122 retrieves each computer identification from the created wireless network (e.g., P2P network or WANET) for inclusion in the network map and relative position map for each computer. In various embodiments, the network map is a scaled (e.g., not to actual size) representation of the physical location of the nodes or computers in the wireless network. A network map created by device positioning program 122 includes the position of each of the computers connected in the wireless network based, at least in part, on an analysis of the received digital image files of the photographs recorded by computers 130A, B, C, and D. An example of a network map based on the panoramic digital image file for computers arranged in a circular manner to share data is depicted in Step 3 of FIG. 2.

In embodiments, device positioning program 122 creates a network map from a panoramic digital image file of the joined or merged digital image data from the photographs taken by each of the computers in the network. In various embodiments, device positioning program 122 stitches or joins the digital image files of the photographs taken across the center of a round table to create a panoramic digital image file. For example, the joined digital image data for the set of received photographs is fitted to a circle for a round table then, the network map would be round but generated to a different size (e.g., created in pixels from the digital image files). In various embodiments, device positioning program 122 creates a panoramic digital image file by matching an edge of the table in one or more photographs and fitting the merged edges of the table into a circle. In various embodiments, when analyzing a panoramic digital image file of photographs taken across a round table or a circle, device positioning program 122 determines the computer location (e.g., of the computer taking the photograph across the table or circle) as the center of the photograph. In this case, the location used by the computer is 180 degrees (or flipped) from the physical location of the computer around the table or circle, however the relative position (e.g., computer A is next to computer B, etc.) of the various computers in the panoramic digital image file is correct while flipped or 180 degrees off of actual position on the table or circle.

In other embodiments, device positioning program 122 joins one or more photographs taken by one or more computers using a conventional panoramic digital photograph technique where vertical edges of a photograph are joined or merged. In this case, digital images of the photographs are merged or joined using standard panoramic photograph techniques to create a 360 degree panoramic digital image file. For example, a panoramic digital image file may be joining the edges of photographs to create a linear photographic image similar to standard panoramic photography however, device positioning program 122 wraps the digital images to join all the respective edges of the photographs and fits the wrapped digital images to a circle creating a 360 degree digital panoramic image file (e.g., a cylinder like photograph of the attendees around the round table where the attendees are approximately forming a circle from a top down view of the 360 degree panorama). In these embodiments, device positioning program 122 determines an approximate location of the computer using a bisecting point between a line to the center of the circle (e.g., the table) and the attendee with the computer. The location of the attendees in these embodiments is determined by device positioning program 122 using known shape recognition or facial recognition algorithms. In some embodiments, a panoramic digital image file is created from downward aimed photographs (e.g., a bird's eye view). For example, a series of photographs taken around the group with a selfie stick held above the center of the group and rotated around, and shape recognition or facial recognition may be used by device positioning program to determine a computer location based, on an assumed proximity to the attendee.

Device positioning program 122 may determine the location of each computer (e.g., computer 130A, B, C, and D) based, at least in part, on the photograph across the table or circle and the provided computer identification provided with the photograph across the table. For example, computer A location may be determined by device positioning program 122 based on analysis of the created panoramic digital image file and the received initial photograph taken straight across the table by computer A that was sent with a unique device identifier (e.g., a MAC address for computer A).

In some embodiments, device positioning program 122 stitches together multiple photographs taken by a computer (e.g., one attendee takes multiple photographs) from one or more of the meeting attendees to create the panoramic digital image file that visually captures the attendee's location in a meeting room or outside around a table. In this example, a normalization of digital images taken by multiple cameras in multiple computers can be omitted. In one embodiment, device positioning program 122 aggregates still images extracted from one or more videos taken by meeting attendees or merges the video to create a panoramic digital image file or a video visually capturing the location of the meeting attendees. When extracted still images from a video are used, device positioning program 122 may need to provide an adjustment to convert video pixels into a square pixel format as used in various still digital cameras.

In another embodiment, device positioning program 122 uses shape matching software algorithms to fit the merged or joined digital image data to a known shape. For example, when the group or meeting attendees at a table of a known shape such as a round table, then the joined digital image data from the photographs taken by computers 130A, B, C, and D may fit to the edge of the table in the various digital image files received from computers 130A, B, C, and D to the known table shape. For example, one or more attendees using the respective user interface, UI 133A, B, C, or D, inputs a table shape such as round, square, or oblong from a pop-up menu into device positioning program 122. In the case of a circular table, a shape-fitting algorithm may be applied to the stitched or joined digital image data from the photographs to create a circle using the edge of the round conference table.

In other embodiments, device positioning program 122 may utilize known intensity-based algorithms used in image registration to match the conference table in the various images (similar or the same color intensity/texture). The panoramic digital image file resulting from the stitched or joined digital image data from the photographs using shape fitting of the round conference table edge can be used to determine a relative location of the attendees or users of computers 130A, B, C, and D.

Figure 5:
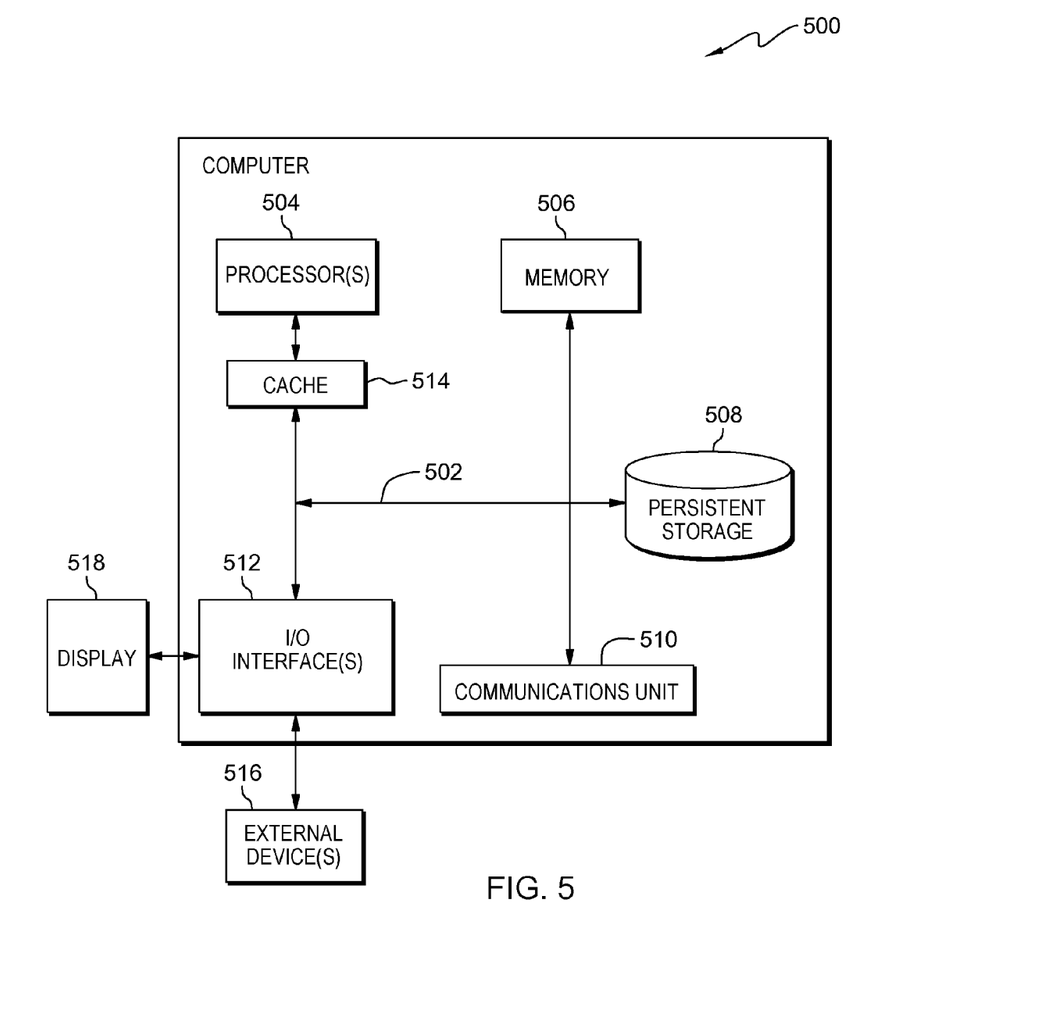
FIG. 5 is a block diagram of components of the server computer executing the device positioning program, in accordance with an embodiment of the present invention.

Device positioning program 122 creates a network map using the location of each of the attendees in the photographs of the meeting or the group of attendees in the wireless network for a location of computers in the network. In these embodiments, device positioning program 122 determines the computer location to be in the proximity of the attendee therefore, the attendee's location is used as the computer location. In an embodiment, each user sends a selfie to device positioning program 122 along at least one of with their user ID and computer identification. In one embodiment, device positioning program 122 matches the faces in the captured received photographs with the received selfies. In some embodiments, device positioning program 122 uses a facial recognition software to identify frequent meeting or group user. For example, device positioning program 122 may identify a user using facial recognition and store the user's name and computer identification in persistent storage 508 in the respective computer or in a database.

Device positioning program 122 determines the relative position of each computer relative to a selected computer (306). Device positioning program 122 using a panoramic digital image file created from the merged photographs captured by computers 130A, B, C, and D's respective digital cameras determines the relative positions of computers 130A, B, C, and D. The relative position of each of the computers with reference to a selected computer in the network is determined by one of several methods.

Figure 4:
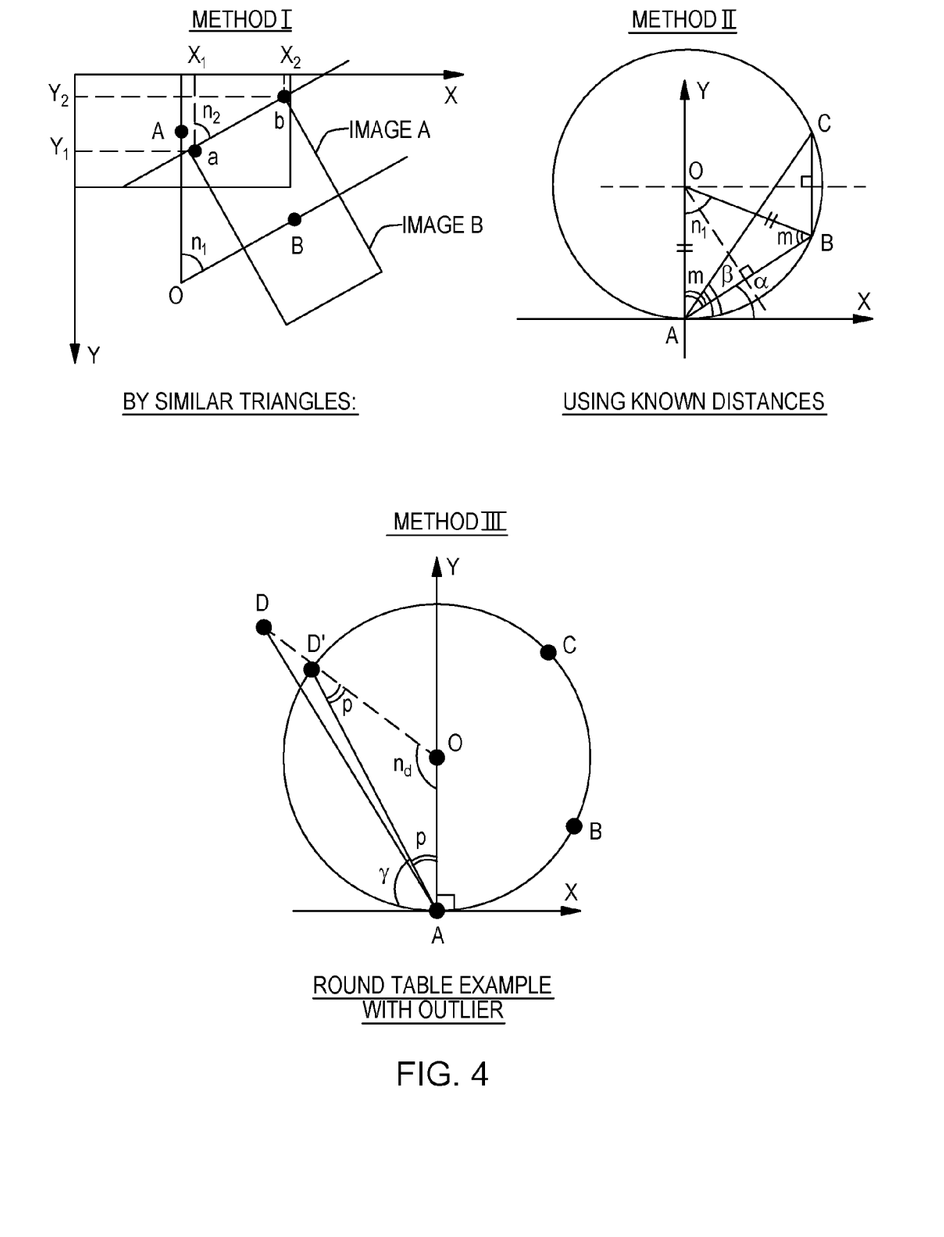
FIG. 4 depicts examples of various methods of determining a relative positioning map for a computer, in accordance with an embodiment of the present invention.

In various embodiments, the relative position of a computer with respect to another selected computer may be generated by using a similar triangle method as depicted in method I of FIG. 4. For example, method I is used when the photographs taken over the center of a table or circle by each of the computers in the network are joined by the edges of the table and the table edges are fitted to a circle using shape-fitting algorithms by device positioning program 122. In one embodiment, the attendees are standing or sitting in a circular arrangement and device positioning program 122 joins the photographs together by using shape recognition or facial recognition to join the photographs taken straight ahead or across the circle by matching the attendees in each photographs. In this example, device positioning program 122 creates a panoramic digital image file by fitting the identified attendees in to a circle In method I as depicted in FIG. 4, device positioning program 122 uses two adjacent joined digital images from the set of digital image files taken over the center of a circle or a round table and edge joined along with trigonometric functions to calculate the relative angles between each of the computers in the network. In various embodiments, device positioning program 122 uses the joined digital image data from two adjacent computers (e.g., two computers or two users physically next to each other at the round table or in circular group) in the network taken over the center of a circle or a round table. The relative angles are determined from the perspective of a computer where the relative angles are angles that can determine the location of each of the other computers in the network with respect to a computer or a target computer. For the purposes of computing angles for a relative device or computer location in method I, the location of computer A is assumed to be the center of the photograph taken over the center of the table. A similar assumption is used for each of the locations of the other computers in the respective photographs taken over the center of the table. In some embodiments, the relative position of computer B with respect to computer A is determined by the central angle (e.g., angle $n_1$ in Method I on FIG. 4) between computer A and computer B. For example, the central angle can be determined from the lines drawn perpendicular to the tangent to the circle (e.g., network map) at locations A and B where the intersection of the perpendicular lines represents the center of the circle or a round table, O, and the angle between the perpendicular lines is the central angle ($n_1$) representing an angle between the location of computer A and computer B that can be used in a relative position map for computer A (and, for computer A with respect to computer B). Points A and B represent a location for computer A and computer B on the network map created from the joined center photographs fitted to a circle as discussed previously.

Using Method I of FIG. 4 to determine the relative position of computer B with respect to computer A, the two photographs taken directly in front of computers A and B (e.g., across the center of a round table) are joined together to match the edges of the table. The digital images are joined using the previously discussed methods and the long edge of the digital image from computer A's photograph is used as the x-axis or reference for determining the relative angle $n_1$ (a central angle) for the relative location of computer B from the perspective of computer A. The center of image A and image B from the photographs taken by computer A and computer B are marked as A and B respectively and represent the assumed location of computer A and computer B (e.g., the center of the photograph over the center of the table). The short side of the digital image from computer B's photograph is identified in the digital image from computer A and the corners at the short edge of digital image from computer B are located in computer A's digital image are both identified by device positioning program 122. The corners of the short edge of computer B's digital image can be identified as point a, and as point b respectively as depicted in Method I of FIG. 4. Using the short edge of computer A's digital image as the y axis and the long edge of the digital image file as the x axis, device positioning program 122 determines the co-ordinate locations of point a $(X_1, Y_1)$ and point b $(X_2, Y_2)$ using the pixels in the received digital image file from computer A. In the event, that the digital image data is received from a video taken by a computer in the network, a compensation for non-uniform scaling of x and y directions of images from video data may be required using the received metadata from the video. While pixels in photography are generally square, pixels created by video are generally rectangular.

Using the locations of points a and b, $X_1$, $Y_1$ and $X_2$, $Y_2$ respectively are determined by a projection on an x and y axis of the digital image file from computer A where $X_1$, $Y_1$, $X_2$, and $Y_2$ are determined from pixels in the digital image file. By similar triangles, angle $n_1$ and angle $n_2$ are equal and angle $n_2$ can be determined using a tangent function where the tangent, tan $n_2=((Y_1-Y_2)/X_1-X_2)$ and $n_1=n_2$. In some embodiments, the angle from the center of a circle through the center of the digital image files from computer A and B shown in Method I as the bisecting lines through the center of digital image files A and B is the relative position of computer B relative to computer A. For example, as depicted in Method I, angle $n_1$ is used as the relative position of computer B with respect to computer A and vice versa. Using this method a central relative position angle can be computed by device positioning program 122 for each of the pairs of digital image file received from adjacent computers and a relative position angle can be determined from non-adjacent photographs by adding together central angles of angles in one direction (i.e., either clockwise or counter clockwise around the network map). For example, using this method with respect to Step 2 in FIG. 2, a relative position angle for computer C (not shown in FIG. 4) relative to computer A is angle $n_1$ (angle AOB) plus angle BOC. For the embodiments using method I, angle $n_1$ (angle AOB) is a central angle that is used as angle α, the relative position angle of computer B to computer A in step 4 of FIG. 2 and angle BOC is used a central angle for the relative position angle β of computer C with respect to computer A.

In some embodiments, device positioning program 122 receives from one or more computers a set of distances measured using a distance measurement application to determine the angles of each computer relative to the other computers in the network. As depicted in method II of FIG. 4, computers A and B provide distance measurements between computer A, computer B, and computer C (shown as the lines between these computers). In this case, at least two of the computers use known distance measurement applications. In various embodiments, device positioning program 122 uses method II for known distances between computers when the network map is created from edge joined over the center photographs. In some embodiments, device positioning program 122 uses method II with a network map created from a 360-degree standard panoramic digital image file and shape or facial recognition. In another embodiment, device positioning program 122 uses method II with a panoramic digital image file created from a several photographs taken by one computer and shape fitted into a 360 degree circular format.

When at least two of the computers in the network provide distance measurements to each of the other computers in the network, device positioning program 122 can determine the angles between each of the computers in the network using trigonometric functions. For example, when computer A and B send a set of distance measurements for distance from computer A to computer C, computer A to computer B, computer B to computer A, and computer B to computer C, angles α and β may be determined. In method II, device positioning program 122 uses trigonometric functions such as the sum of interior angles in a triangle equal to 180 degrees and equal angles (angle m) for similar length sides of a triangle to determine angle α and angle β using standard trigonometric functions (e.g., sine, cosine, or tangent).

In Method II with reference to the diagram of Method I, angle $n_1$, length AO, length BO, and therefore, angle α for the relative position of computer B with respect to the x-axis through computer A's would be the same. Using angle $n_1$ as calculated above in Method I and bisecting a line from the center O drawn between the location of computer A and computer B where by geometric functions, the interior angles of triangle AOB are equal to 180 degrees. Therefore, angle $n_1$+(angle m)+the right angle from bisection of locations of A and B=180 degrees, or angle m=90 degrees–angle $n_1$. In Method II, device positioning program 122 determines angle α (e.g., the relative position of computer B to computer A and vice versa) as 90 degrees minus angle m is equal to angle α. Using Method II, device positioning program 122 can determine angle β, the relative position angle for computer C with respect to computer A.

For example, device positioning program 122 using the distances between the computers and using trigonometric functions such as sine, cosine, and tangent, the relative angles can be generated. For example, as depicted in Method II from FIG. 4, the following equations can be used to determine angles OAB (Equation 1a), OAC (Equation 1b), and OBC (Equation 1c) to determine a set of relative angles (e.g., angles α and β) for computer A when distances AB, AC, and OA are known:

$$\cos(\text{angle } OAB) = (\tfrac{1}{2} AB)/OA \quad \text{Equation 1a}$$

$$\cos(\text{angle } OAC) = (\tfrac{1}{2} AC)/OA \quad \text{Equation 1b}$$

$$\cos(\text{angle } OBC) = (\tfrac{1}{2} BC)/OA \quad \text{Equation 1c}$$

With the determination of angles OAB, OAC, and OAC, device positioning program 122 may determine the relative position angles for computers B and C, angles α (Equation 2a) and β (Equation 2b) respectively as follows based on the diagram depicted in Method II:

$$\text{angle } \alpha + \text{angle } OAB = 90 \text{ degrees, or angle } \alpha = 90 \text{ degrees–angle } OAB \quad \text{Equation 2a}$$

$$\text{angle } \beta + \text{angle } OAC = 90 \text{ degrees, or angle } \beta = 90 \text{ degrees–angle } OAC \quad \text{Equation 2b}$$

In another embodiment, using known distances between computers determined from at least two computers in the network, device positioning program 122 determines a position for one or more computers in an outlier position (e.g., not in the circle or around a round table). Method III uses known distances between computers A, B, C, and D to determine a set of relative position angles for each of the computers connected in the wireless network. In this method, at least two of the computers in the network include a distance calculating application or software. In Method III, at least three computers or attendees in the meeting are around a round table or in a circle. A network map is determined fitting the network map in a circle using the three computers in the circle or around a round table (e.g., computer A, B, and C in FIG. 4) as previously described. In this embodiment, device positioning program 122 depicts computer D, an outlier not in the circle, as a projection D' on the network map in FIG. 4. Angle $n_d$ and angle p are calculated by device positioning program 122 as discussed in method II. An angle for the relative position of computer D (i.e., angle γ) with respect to computer A can be determined by subtracting angle P from 90 degrees. In Method III, the angle DAD' is ignored and angle γ is an approximation for the location of computer D with respect to computer A when computer D is an outlier not in a circle of computers in the network. Device positioning program 122 can determine a set of relative position angles for computers B, C, and D generated using Method III.

In various embodiments, device positioning program 122 uses Method II when the distance is known between each of the computers in the network, and determines a relative position map for computers (e.g., attendees) in any random order other than computers arranged in a straight line. In this case, device positioning program 122 generates a circle from a target computer to any other two computers (e.g., computer B and computer C) in the network and applies the steps of Method II to determine angle α and angle β for the relative position angle of computer B to computer A and computer B to computer A respectively. Device positioning program 122 repeats this process with the other computers in the network until the relative position angles for each of the computers in the network to the target computer. For example, to continue with computer A as a target computer, a relative position angle for computer D (e.g., angle γ) with respect to computer A may be determined by a circle generated through a location for computer A, computer C, and computer D. Using Method II, angle γ, the relative position angle for computer D with respect to computer A may be calculated.

While various methods for determining a set of relative position angles are discussed in respect to FIG. 4, embodiments of the present invention are not intended to be limited to these methods. The relative position angles used to generate a relative position map can be generated by any other method for determining the relative position of each computer (e.g., a target computer) to each of the other computers in the network.

Device positioning program 122 generates a relative position map for each of the computers in the network (308). Using the relative position angles determined by one or more of the methods discussed above, device positioning program 122 generates a relative position map. In various embodiments, the relative position map is based on a relative position to a tangent to a computer in a circular network map generated from a panoramic digital image file. For example, as depicted in Step 4 in FIG. 2, relative position angles α, β, and γ determined by one or more of the methods discussed above are used by device positioning program 122 to provide a relative position map for computer A. Device positioning program 122 creates similar relative position maps for computers B, C, and D using the methods discussed previously. In some embodiments, the relative position map is based on a calculated center position angle between two computers that is determined for each of the computers in the network. The relative position maps include device identifications received from one of each of the computers, sent with photographs across the circle, sent with selfies, or retrieved from the network set-up information provided by one or more of the attendee's computers. Device positioning program 122 sends the respective relative position map to each of the computers in the network. For example, computer A receives the relative position map depicted in Step 3 that can be used to send data to computers B, C, and D as previously discussed by sliding a finger in the direction indicated on the relative position map to the depicted location of computer B to send data to computer B. Device positioning program 122 sends the relative position map created to each of the respective computers (e.g., computers 130A, B, C, and D).

In some embodiments, upon completion of the meeting or the release of the connection between the computing devices for the meeting, server 120 will delete digital photograph data, digital video data, and resulting device positional data created from the received digital photographs or videos.

FIG. 5 depicts a block diagram of components of server 120 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server 120 includes communications fabric 502, which provides communications between cache 514, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 514 is a fast memory that enhances the performance of computer processor(s) 504 by holding recently accessed data, and data near accessed data, from memory 506.

Programs and data used for implementation of embodiments of the present invention, i.e., device positioning program 122, may be stored in persistent storage 508 and in memory 506 for execution by one or more of the respective computer processors 504 via cache 514. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Device positioning program 122 may be downloaded to persistent storage 508 through communications unit 510.

I/O interface(s) 512 allows for input and output of data with other devices that may be connected to server 120. For example, I/O interface 512 may provide a connection to external devices 516 such as a keyboard, keypad, a touch screen, and/or some other suitable input device. External devices 516 can also include portable computer readable storage media such as, for example, thumb drives, portable optical or magnetic disks, and memory cards. Software and data used to practice embodiments of the present invention, e.g., device positioning program 122 can be stored on such portable computer readable storage media and can be loaded onto persistent storage 508 via I/O interface(s) 512. I/O interface(s) 512 also connect to a display 518.

Display 518 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application, or technical improvement over technologies found in the marketplace, or to enable others of ordinary skill in the art to understand the embodiments disclosed herein.

What is claimed is:

1. A computer program product for determining a relative position for each computing device of a group of computing devices within a wireless network to a computing device within the wireless network, the computer program product comprising:

one or more computer readable storage devices, wherein the one or more computer readable storage devices are not a transitory signal per se, and program instructions stored on the one or more computer readable storage devices, the stored program instructions comprising:

program instructions to receive a set of digital image files from each computing device of the group of computing devices within the wireless network, wherein receiving the set of digital image files includes receiving at least one of: a digital image file from a photograph taken straight ahead from each of the computing devices in the group of computing devices, a set of digital image files from a set of photographs taken by one computing device in the group of computing devices, or a set of still images extracted from videos taken by one or more computing devices in the group of computing devices and wherein receiving the set of digital image files further comprises receiving, by the one or more computer processors, a distance from each computing device of the group of computing devices to at least two other computing devices in the group of computing devices within the wireless network;

program instructions to aggregate the set of digital image files into a panoramic digital image file;

program instructions to generate a network map depicting a position of each of computing device in the group of computing devices within the wireless network based, at least in part, on the panoramic digital image file;

program instructions to determine a relative position map for at least one computing device based, at least in part, on the network map and the panoramic digital image file, wherein the relative position map provides a location of each computing device of the group of computing devices within the wireless network with respect to the at least one computing device, and wherein the relative position map is determined by a set of relative position angles that provide a location of each of the computing devices in the group of computing devices with respect to the at least one computing device, the set of relative position angles based, at least in part, on the panoramic digital image file; and program instructions to receive input from the at least one computing device, the input using the relative position map to send data to one or more computing devices of the group of computing devices within the wireless network.

* * * * *